US011328383B2

(12) United States Patent
Tanaka et al.

(10) Patent No.: US 11,328,383 B2
(45) Date of Patent: May 10, 2022

(54) IMAGE PROVISION APPARATUS, IMAGE PROVISION METHOD, AND COMPUTER READABLE MEDIUM

(71) Applicant: MITSUBISHI ELECTRIC CORPORATION, Tokyo (JP)

(72) Inventors: Satoru Tanaka, Tokyo (JP); Mitsunori Kori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 141 days.

(21) Appl. No.: 16/642,755

(22) PCT Filed: Oct. 5, 2017

(86) PCT No.: PCT/JP2017/036206
§ 371 (c)(1),
(2) Date: Feb. 27, 2020

(87) PCT Pub. No.: WO2019/069415
PCT Pub. Date: Apr. 11, 2019

(65) Prior Publication Data
US 2020/0193557 A1 Jun. 18, 2020

(51) Int. Cl.
*G06T 1/60* (2006.01)
*G06T 1/00* (2006.01)

(52) U.S. Cl.
CPC .............. *G06T 1/60* (2013.01); *G06T 1/0007* (2013.01)

(58) Field of Classification Search
CPC .......... G06T 1/20; G06T 1/60; G06T 15/005; G06T 11/40; G06T 15/04; G06T 1/0007;
(Continued)

(56) References Cited

U.S. PATENT DOCUMENTS

| 4,553,206 A | 11/1985 | Smutek et al. |
| 2010/0110492 A1 | 5/2010 | Matsuhira et al. |

(Continued)

FOREIGN PATENT DOCUMENTS

| EP | 2 645 712 A1 | 10/2013 |
| JP | 59-161174 A | 9/1984 |

(Continued)

OTHER PUBLICATIONS

International Search Report, issued in PCT/JP2017/036206, PCT/ISA/210, dated Nov. 7, 2017.

(Continued)

*Primary Examiner* — Abderrahim Merouan
(74) *Attorney, Agent, or Firm* — Birch, Stewart, Kolasch & Birch, LLP (57) ABSTRACT

In an image provision apparatus (100), a decomposition unit (111) decomposes image data into pieces of unit image data (70). A storing unit (112) stores, in a memory unit (130), image management information (131) including each piece of unit image data (70) of the pieces of unit image data and position information. An acquisition unit (121) accepts a provision request (52). The provision request (52) includes range information representing a range of a partial image in the image. The acquisition unit (121) acquires a unit image data set (711) representing unit images each including at least part of the partial image from the image management information (131), based on the range information and the position information. A generation unit (122) generates the partial image (63) based on the unit image data set (711).

4 Claims, 9 Drawing Sheets

(58) Field of Classification Search
CPC .......... G06T 9/00; G06T 15/00; G06T 9/005;
G06T 9/007; G06T 1/00; G06T 5/003;
G09G 5/363; G09G 5/393
See application file for complete search history.

(56) References Cited

U.S. PATENT DOCUMENTS

| | | |
|---|---|---|
| 2010/0215149 A1 | 8/2010 | Takemoto et al. |
| 2011/0194781 A1* | 8/2011 | Niemi .................... H04N 19/40 382/232 |
| 2014/0185882 A1 | 7/2014 | Masuura et al. |
| 2015/0220568 A1 | 8/2015 | Ueda |
| 2016/0163020 A1 | 6/2016 | Kim et al. |

FOREIGN PATENT DOCUMENTS

| | | |
|---|---|---|
| JP | 60-81654 A | 5/1985 |
| JP | 7-271953 A | 10/1995 |
| JP | 2537481 B2 | 9/1996 |
| JP | 2010-114576 A | 5/2010 |
| JP | 2010-214094 A | 9/2010 |
| JP | 2013-41387 A | 2/2013 |
| JP | 2014-137750 A | 7/2014 |
| JP | 2015-179377 A | 10/2015 |

OTHER PUBLICATIONS

Extended European Search Report dated Aug. 12, 2020 in corresponding European Application No. 17 927 873.4.
Communication pursuant to Article 94(3) EPC dated Nov. 24, 2021 in corresponding European Application No. 17927873.4.

\* cited by examiner

IMAGE PROVISION APPARATUS, IMAGE PROVISION METHOD, AND COMPUTER READABLE MEDIUM

TECHNICAL FIELD

The present invention relates to an image provision apparatus, an image provision method, and an image provision program.

BACKGROUND ART

In order to diagnose deterioration of a huge structure such as a tunnel or a bridge, there is a technique of managing image data obtained by photographing the structure. In order to record every single deterioration phenomenon, such as a minute crack, that has occurred in the structure, high-resolution image data needs to be created. High-resolution image data is required for the entire structure, so that a vast amount of image data is involved.

In order to diagnose deterioration using image data, a range necessary for diagnosis needs to be extracted from the image data. Depending on the diagnostic environment, the resolution of the extracted image data may need to be reduced.

Patent Literature 1 discloses a technique for facilitating image processing by decomposing image data into pieces of raster line data and assigning an index to each piece of raster line data. Raster line data is data that represents a block of pixels arranged in a lateral row in an image.

CITATION LIST

Patent Literature

[Patent Literature 1] JP 2537481 B

SUMMARY OF INVENTION

Technical Problem

In the technique of Patent Literature 1, when an enormous amount of image data is handled, an enormous size of raster line data is involved. Therefore, in the technique of Patent Literature 1, when an enormous amount of image data is handled, the overhead of image processing is increased and creation of an image necessary for diagnosis is slowed down.

It is an object of the present invention to reduce the overhead of image processing and rapidly provide an image necessary for diagnosis by further decomposing raster line data.

Solution to Problem

An image provision apparatus according to the present invention includes a decomposition unit to decompose image data representing an image into pieces of unit image data representing unit images obtained by decomposing the image in a row direction and a column direction;

a storing unit to store, in a memory unit, image management information including each piece of unit image data of the pieces of unit image data and position information representing a position of a corresponding one of the unit images in the image;

an acquisition unit to accept a provision request to request provision of a partial image, which is at least part of the image, the provision request including range information representing a range of the partial image in the image, and acquire, as a unit image data set, a set of pieces of unit image data each representing a unit image including at least part of the partial image from the image management information, based on the range information and the position information; and a generation unit to generate the partial image based on the unit image data set.

Advantageous Effects of Invention

According to an image provision apparatus of the present invention, a partial image can be generated using unit image data, so that the overhead of image processing is reduced and the partial image can be provided rapidly.

DESCRIPTION OF EMBODIMENTS

Embodiments of the present invention will be described hereinafter with reference to the drawings. Throughout the drawings, the same or corresponding portions are denoted by the same reference signs. In the description of the embodiments, description of the same or corresponding portions will be suitably omitted or simplified.

First Embodiment

*Description of Configuration*

Figure 1:
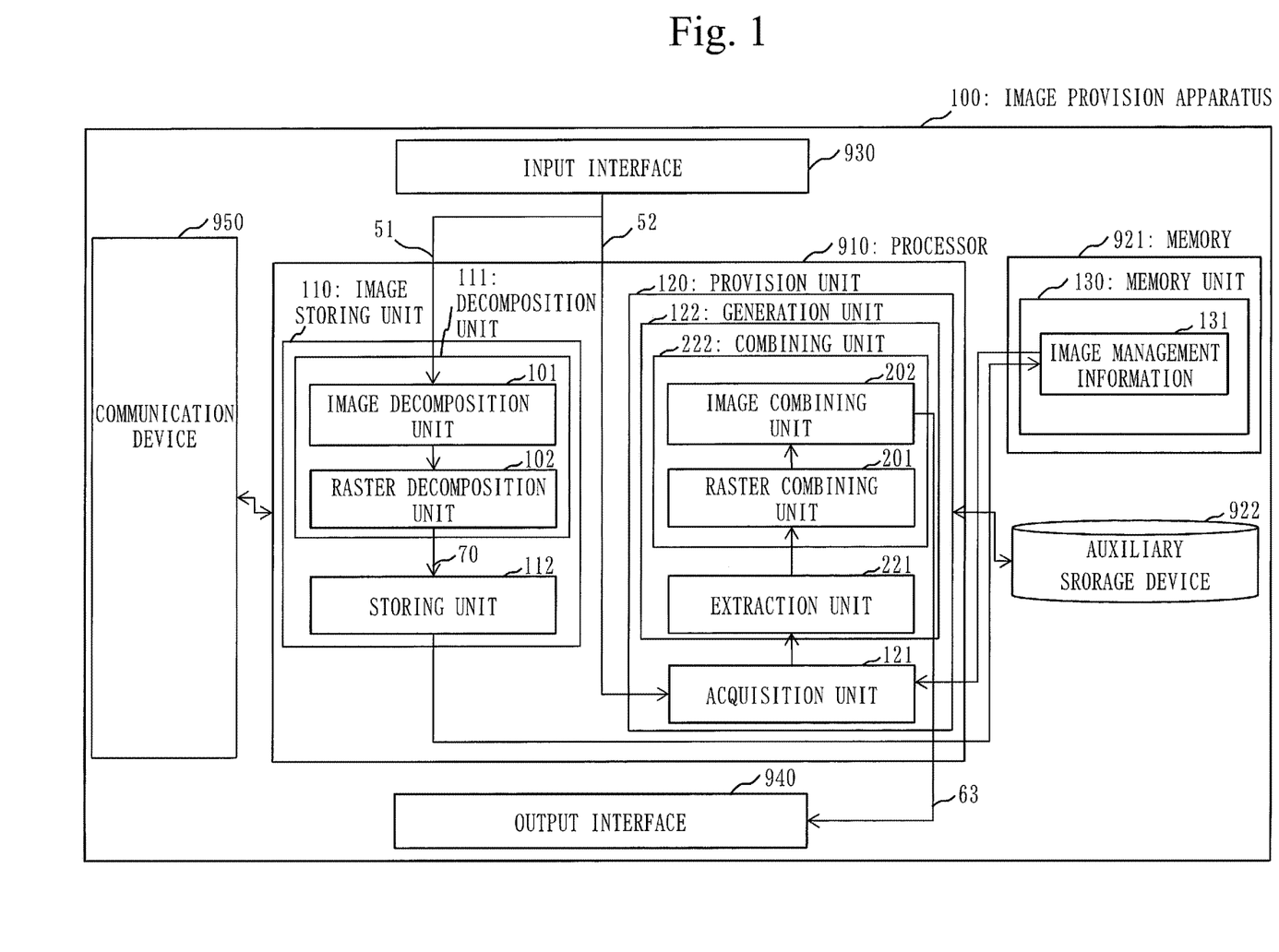
FIG. 1 is a configuration diagram of an image provision apparatus 100 according to a first embodiment.

A configuration of an image provision apparatus 100 according to this embodiment will be described with reference to FIG. 1.

The image provision apparatus 100 is a computer. The image provision apparatus 100 includes a processor 910, and also includes other hardware components such as a memory 921, an auxiliary storage device 922, an input interface 930, an output interface 940, and a communication device 950. The processor 910 is connected with the other hardware components via signal lines and controls these other hardware components.

The image provision apparatus 100 includes, as functional elements, an image storing unit 110 and a provision unit 120. The image storing unit 110 includes a decomposition unit 111 and a storing unit 112. The decomposition unit 111 includes an image decomposition unit 101 and a raster decomposition unit 102. The provision unit 120 includes an acquisition unit 121 and a generation unit 122. The generation unit 122 includes an extraction unit 221 and a combining unit 222. The combining unit 222 includes an image combining unit 202 and a raster combining unit 201. A memory unit 130 stores image management information 131.

The functions of the image storing unit 110 and the provision unit 120, that is the functions of the decomposition unit 111, the storing unit 112, the acquisition unit 121, and the generation unit 122 are realized by software. The memory unit 130 is provided in the memory 921. The memory unit 130 may be provided in the auxiliary storage device 922.

The processor 910 is a device that executes an image provision program. The image provision program is a program for realizing the functions of the image storing unit 110 and the provision unit 120.

The processor 910 is an integrated circuit (IC) that performs arithmetic processing. Specific examples of the processor 910 are a central processing unit (CPU), a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash. DVD is an abbreviation for Digital Versatile Disk.

The input interface 930 is a port connected with an input device such as a mouse, a keyboard, or a touch panel. Specifically, the input interface 930 is a Universal Serial Bus (USB) terminal. Note that the input interface 930 may be a port connected with a local area network (LAN).

The output interface 940 is a port to which a cable of an output device such as a display is connected. Specifically, the output interface 940 is a USB terminal or a High Definition Multimedia Interface (HDMI, registered trademark) terminal. Specifically, the display is a liquid crystal display (LCD).

The communication device 950 is a device that communicates with other devices via a network. The communication device 950 has a receiver and a transmitter. The communication device 950 is connected to a communication network, such as a LAN, the Internet, or a telephone line, via wire or wirelessly. Specifically, the communication device 950 is a communication chip or a network interface card (NIC).

The image provision program is read by the processor 910 and executed by the processor 910. The memory 921 stores not only the image provision program but also an operating system (OS). The processor 910 executes the OS while executing the OS. The image provision program and the OS may be stored in the auxiliary storage device 922. The image provision program and the OS stored in the auxiliary storage device 922 are loaded into the memory 921 and executed by the processor 910. Note that part or the entirety of the image provision program may be embedded in the OS.

The image provision apparatus 100 may include a plurality of processors in place of the processor 910. These processors share the execution of the image provision program. Each of the processors is, like the processor 910, a device that executes the image provision program.

Data, information, signal values, and variable values that are used, processed, or output by the image provision program are stored in the memory 921 or the auxiliary storage device 922, or stored in a register or a cache memory in the processor 910.

The image provision program causes a computer to execute each process, each procedure, or each step, where each "unit" of each unit of the image storing unit 110 and the provision unit 120 is interpreted as each "process", each "procedure", or each "step". An image provision method is a method performed by the image provision apparatus 100 through the execution of the image provision program.

The image provision program may be stored in and provided in a computer readable recording medium. Alternatively, the image provision program may be provided as a program product.

\*\*\*Description of Operation\*\*\*

Operation of the image provision apparatus 100 according to this embodiment will now be described.

An image provision process of the image provision apparatus 100 includes an image storage process S110 and a provision process S120.

<Image Storage Process S110>

Figure 2:
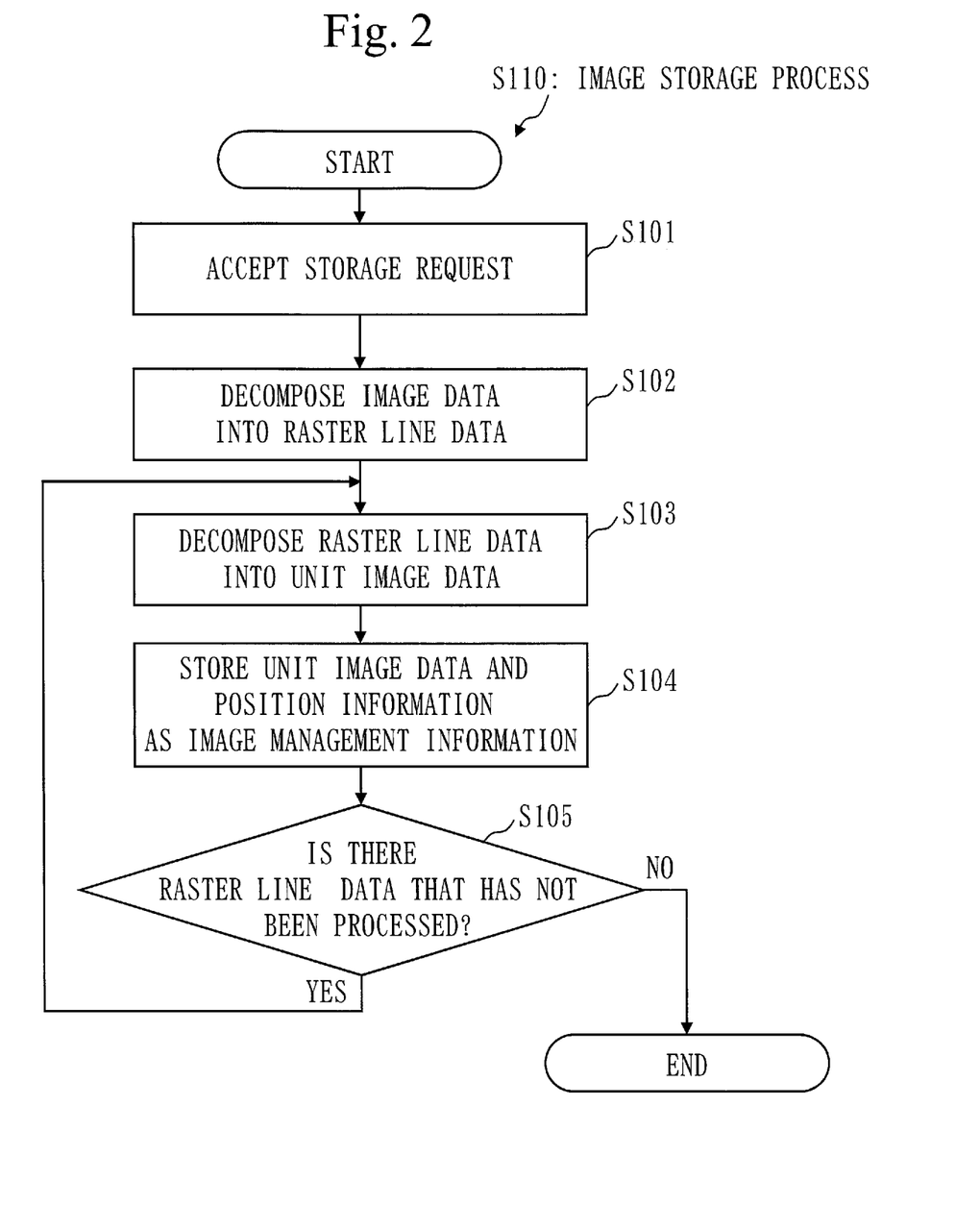
FIG. 2 is a flowchart of an image storage process S110 according to the first embodiment.
Figure 3:
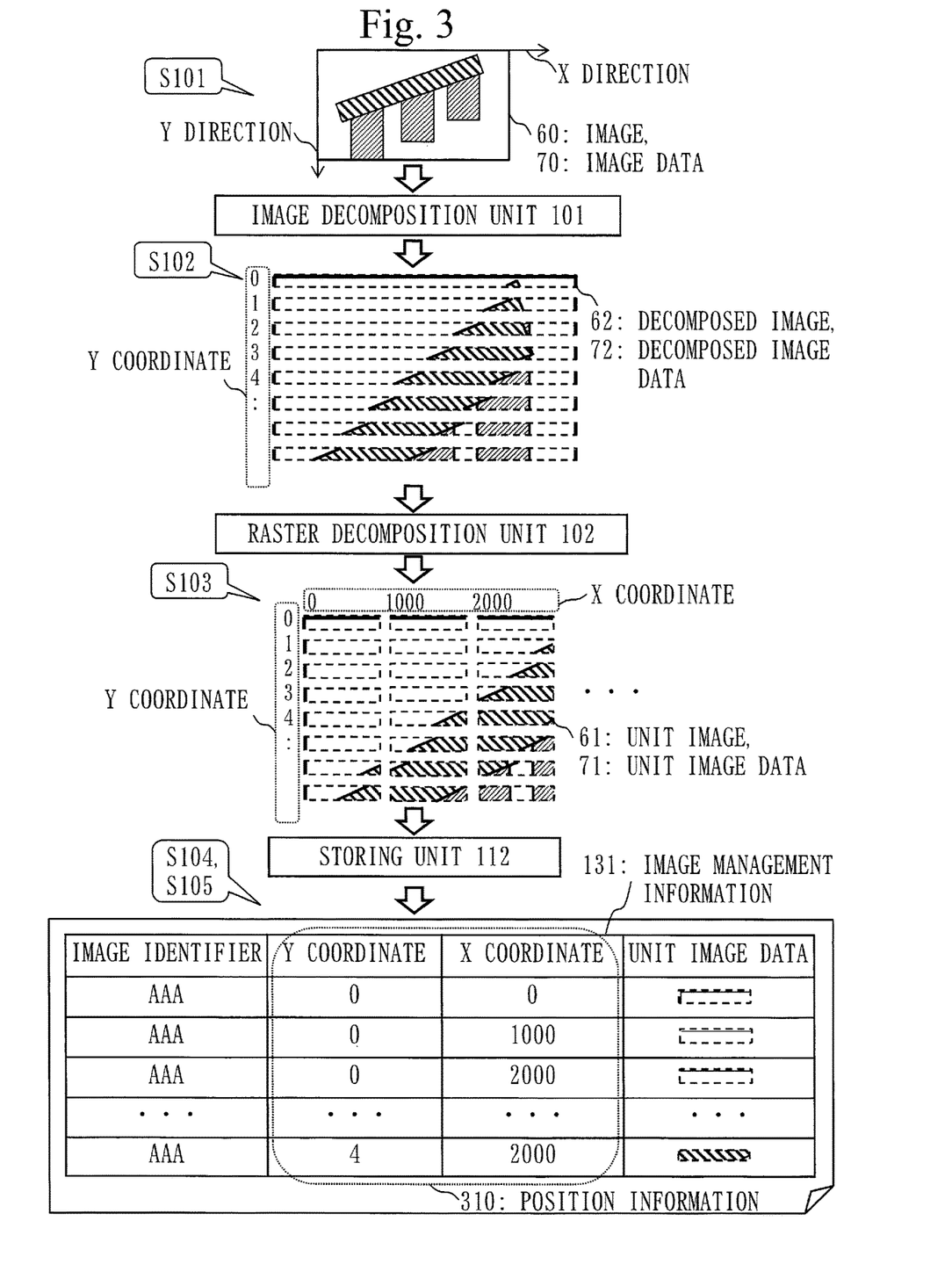
FIG. 3 is a diagram illustrating details of the image storage process S110 according to the first embodiment.

FIG. 2 is a flowchart of the image storage process S110 according to this embodiment. FIG. 3 is a diagram illustrating details of the image storage process S110 according to this embodiment. The image storage process S110 according to this embodiment will be described with reference to FIGS. 2 and 3.

In step S101, the decomposition unit 111 of the image storing unit 110 accepts a storage request 51 via the input interface 930. The storage request 51 is information to request storage of image data 70 in the memory unit 130. The storage request 51 includes the image data 70 and an image identifier for identifying the image data 70. Note that the decomposition unit 111 may accept the storage request 51 via the communication device 950.

Next, in steps S102 and S103, the decomposition unit 111 decomposes the image data 70 into pieces of unit image data 71.

As illustrated in FIG. 3, the image data 70 is data representing an image 60. The image 60 extends in a row direction and a column direction. The row direction is an X direction. The row direction is also referred to as a lateral direction. The column direction is a Y direction. The column direction is also referred to as a longitudinal direction. The pieces of unit image data 71 are pieces of data representing unit images 61 obtained by decomposing the image 60 in the row and column directions.

Steps S102 and S103 will be described in detail below.

In step S102, the image decomposition unit 101 of the decomposition unit 111 decomposes the image data 70 into pieces of decomposed image data 72. The pieces of decomposed image data 72 represent decomposed images 62 obtained by decomposing the image 60 in the row direction. A decomposed image 62 is referred to as a raster line. Decomposed image data 72 is referred to as raster line data. That is, the image decomposition unit 101 decomposes the image data 70 into pieces of raster line data. The image decomposition unit 101 assigns, to each piece of raster line data, a Y coordinate value representing the position of a corresponding raster line in the image 60.

Specifically, the image decomposition unit 101 reads the pieces of raster line data sequentially from the image data 70. Each piece of raster line data is data representing a block of pixels arranged in a row in the X direction. The image decomposition unit 101 creates data containing a set of each piece of raster line data and the Y coordinate value representing the position of a corresponding raster line in the image 60. As illustrated in step S102 of FIG. 3, each piece of raster line data is assigned 0, 1, 2, 3, 4, or a subsequent number, as the Y coordinate value.

In step S103, the raster decomposition unit 102 of the decomposition unit 111 decomposes each piece of the pieces of decomposed image data 72, that is, each piece of the pieces of raster line data into pieces of unit image data 71. The pieces of unit image data 71 represent unit images 61 obtained by decomposing each of the decomposed images 62 in the column direction. The raster decomposition unit 102 decomposes each piece of raster line data so that the sizes in the X direction of the pieces of unit image data 71 are uniform. The raster decomposition unit 102 assigns, to each piece of unit image data 71, an X coordinate value representing the position of a corresponding unit image 61 in the image 60. The raster decomposition unit 102 is also referred to as a raster decomposition unit.

As illustrated in FIG. 3, the raster decomposition unit 102 decomposes each piece of raster line data in units of 1000 pixels. The size in the X direction may be a value other than 1000 pixels.

In step S104, the storing unit 112 of the image storing unit 110 stores, in the memory unit 130, image management information 131 including each piece of unit image data 71 of the pieces of unit image data and position information 310. The position information 310 represents the position of each unit image 61 in the image 60. Specifically, the position information 310 is composed of an X coordinate value and a Y coordinate value associated with each piece of unit image data 71. The storing unit 112 stores, in the memory unit 130, the image management information 131 in which the image identifier of the image 60, the Y coordinate value, and the X coordinate value are associated with each piece of unit image data 71. For example, the memory unit 130 is a database with a table structure, such as a relational database or a column-oriented database. That is, the storing unit 112 can store the image management information 131 in a database with a table structure.

By storing the image management information 131 in this way, a piece of unit image data 71 can be acquired from the image management information 131, using the image identifier, the Y coordinate value, and the X coordinate value as keys. The image management information 131 is also referred to as a raster data management table.

In step S105, the raster decomposition unit 102 determines whether there is a piece of raster line data that has not been processed. If there is a piece of raster line data that has not been processed, the raster decomposition unit 102 returns to step S103. If there is no piece of raster line data that has not been processed, the raster decomposition unit 102 ends the process.

<Provision process S120>

Figure 4:
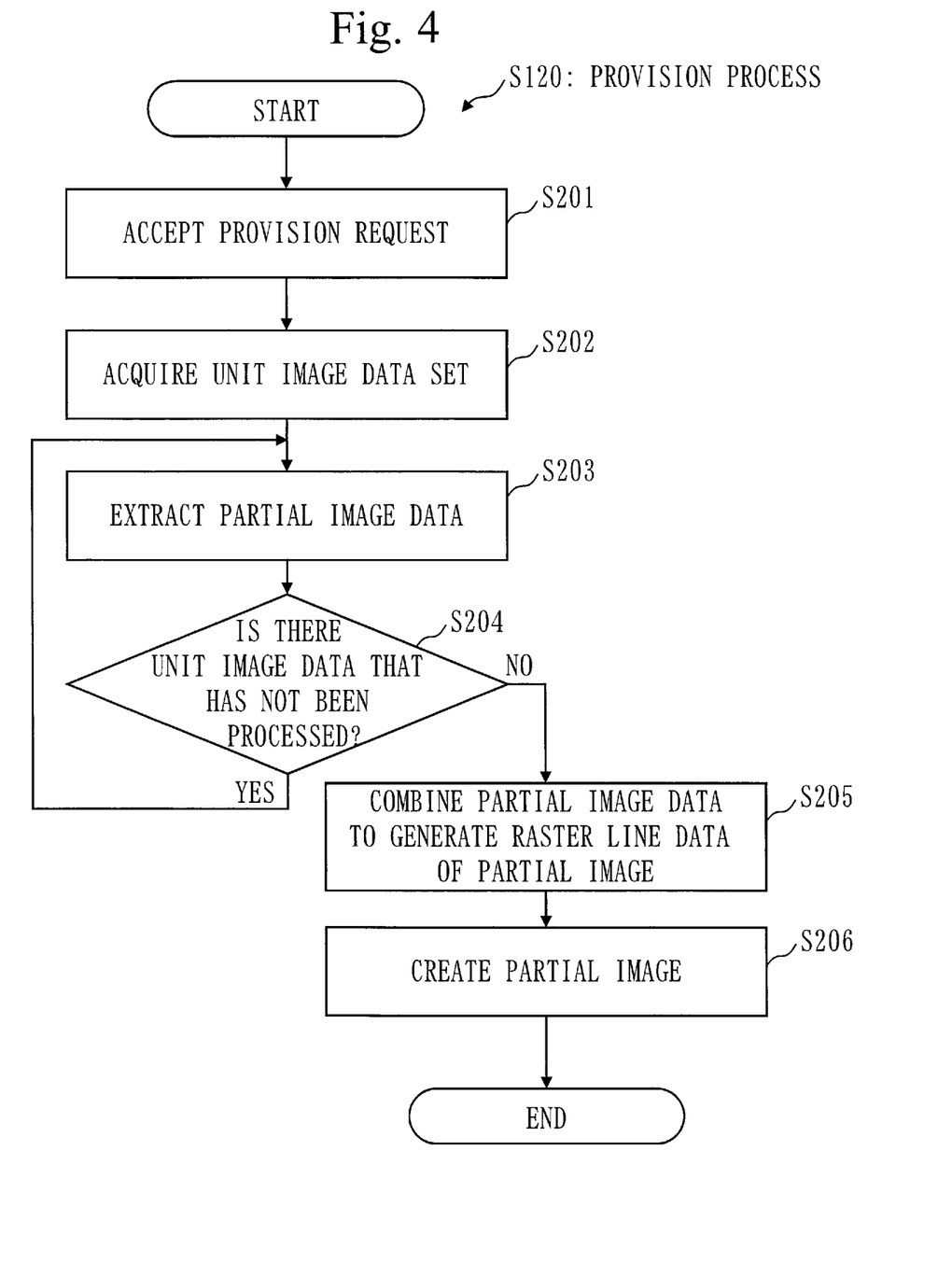
FIG. 4 is a flowchart of a provision process S120 according to the first embodiment.
Figure 5:
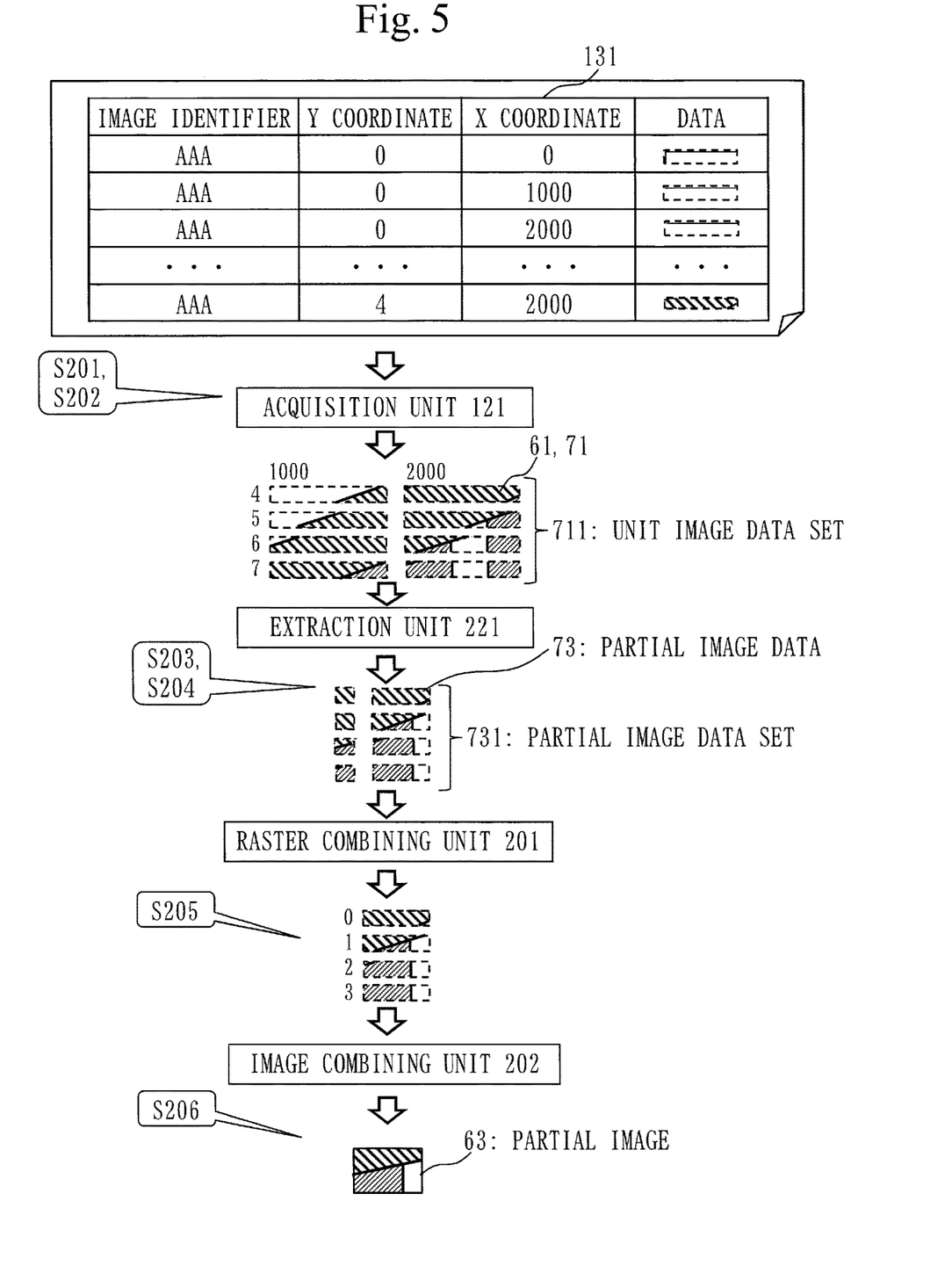
FIG. 5 is a diagram illustrating details of the provision process S120 according to the first embodiment.

FIG. 4 is a flowchart of the provision process S120 according to this embodiment. FIG. 5 is a diagram illustrating details of the provision process S120 according to this embodiment. The provision process S120 according to this embodiment will be described with reference to FIGS. 4 and 5.

In step S201, the acquisition unit 121 of the provision unit 120 accepts a provision request 52 via the input interface 930. The provision request 52 is information to request the provision of a partial image 63, which is at least part of the image 60. The provision request 52 includes the image identifier for identifying the image 60 and range information representing a range of the partial image 63 in the image 60. The partial image 63 is an image the provision of which is requested, out of the image 60. Note that the acquisition unit 121 may accept the provision request 52 via the communication device 950.

In step S202, the acquisition unit 121 acquires a unit image data set 711 from the image management information 131, based on the range information included in the provision request 52 and the position information 310. The unit image data set 711 is a set of pieces of unit image data 71 each representing a unit image 61 including at least part of the partial image 63. Specifically, the range information is the coordinates of the vertices of the partial image 63 in the image 60.

In steps S203 to S206, the generation unit 122 generates the partial image 63 based on the unit image data set 711. The unit image data set 711 contains all the pieces of unit image data 71 representing all the unit images 61 each including at least part of the partial image 63. Therefore, the image represented by the unit image data set 711 contains the partial image 63.

Steps S203 to S206 will be described in detail below.

In step S203, the extraction unit 221 extracts partial image data 73 from each piece of all the pieces of unit image data 71 included in the unit image data set 711. Partial image data 73 is data representing at least part of the partial image 63. A piece of unit image data 71 included in the unit image data set 711 may include a portion that is unnecessary for representing the partial image 63. Therefore, the extraction unit 221 extracts only a portion necessary for representing the partial image 63 from each piece of unit image data 71 included in the unit image data set 711 and outputs it as partial image data 73.

Note that a piece of unit image data 71 included in the unit image data set 711 may not include any portion that is unnecessary for representing the partial image 63. In this case, the extraction unit 221 outputs the piece of unit image data 71 as partial image data 73.

In step S204, the extraction unit 221 determines whether there is a piece of unit image data 71 that has not been processed in the unit image data set 711. If there is a piece of unit image data 71 that has not been processed, the extraction unit 221 returns to step S203. If there is no piece of unit image data 71 that has not been processed, the extraction unit 221 proceeds to step S205.

As illustrated in FIG. 5, a set of the pieces of partial image data 73 output from the extraction unit 221 is referred to as a partial image data set 731. Note that the extraction unit 221 is also referred to as a cut-out unit to cut out a range representing the partial image 63 from a piece of unit image data 71.

In steps 5205 and 5206, the combining unit 222 generates the partial image 63 by combining all the pieces of partial image data 73 extracted by the extraction unit 221.

In step S205, the raster combining unit 201 of the combining unit 222 combines pieces of partial image data 73 corresponding to each raster line of the partial image 63, out of the pieces of partial image data 73 included in the partial image data set 731. The raster combining unit 201 thus generates pieces of raster line data representing the raster lines of the partial image 63.

In step S206, the image combining unit 202 of the combining unit 222 combines the pieces of raster line data generated by the raster combining unit 201, so as to generate the partial image 63.

*Other Configuration*

In this embodiment, the functions of the image provision apparatus 100 are realized by software. As a variation, however, the functions of the image provision apparatus 100 may be realized by hardware.

Figure 6:
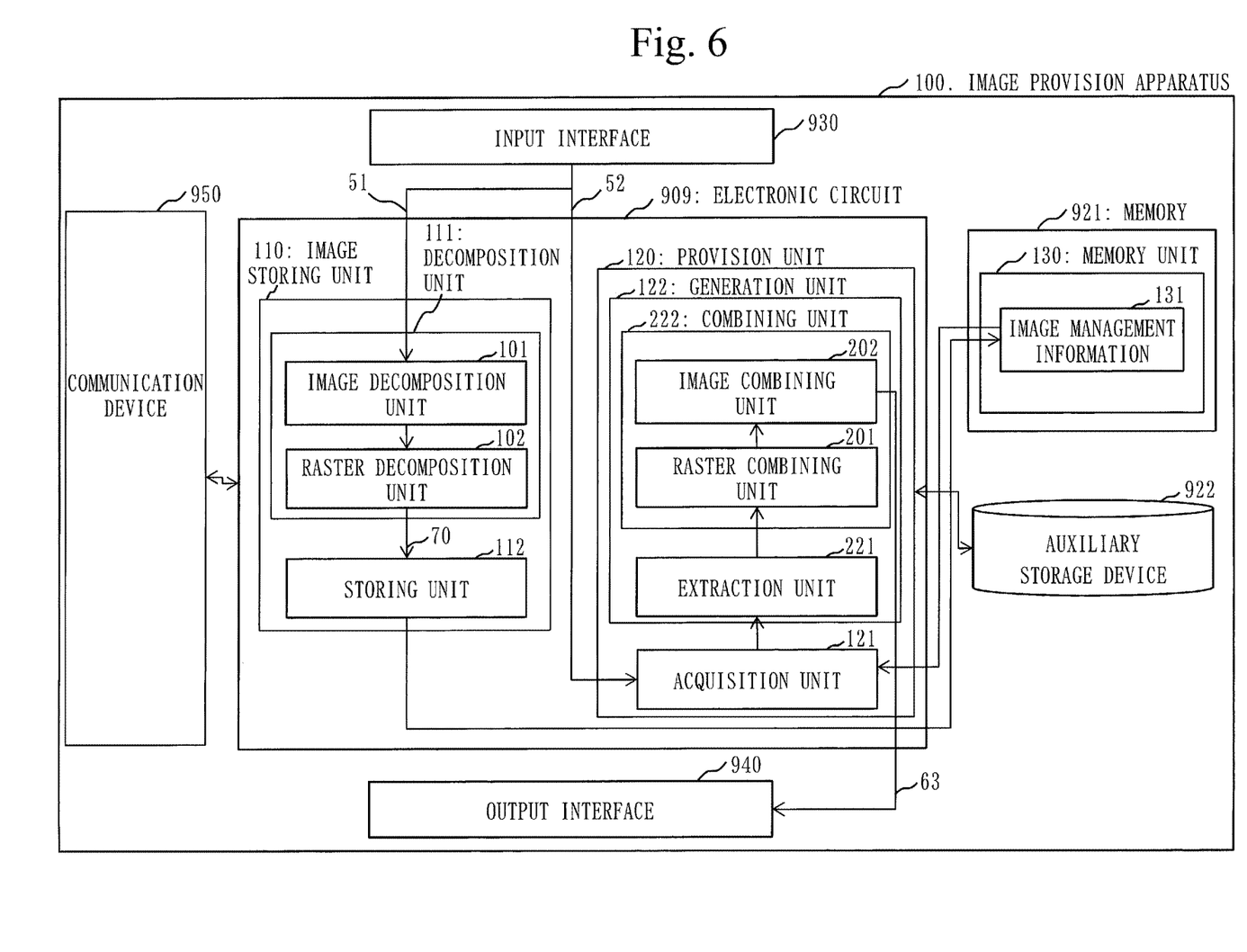
FIG. 6 is a configuration diagram of the image provision apparatus 100 according to a variation of the first embodiment.

FIG. 6 is a diagram illustrating a configuration of the image provision apparatus 100 according to the variation of this embodiment.

The image provision apparatus 100 includes an electronic circuit 909, the auxiliary storage device 922, the input interface 930, the output interface 940, and the communication device 950.

The electronic circuit 909 is a dedicated electronic circuit that realizes the functions of the image storing unit 110 and the provision unit 120.

Specifically, the electronic circuit 909 is a single circuit, a composite circuit, a programmed processor, a parallel-programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array.

The functions of the components of the image provision apparatus 100 may be realized by one electronic circuit, or may be distributed among and realized by a plurality of electronic circuits.

As a different variation, some of the functions of the components of the image provision apparatus 100 may be realized by the electronic circuit, and the rest of the functions may be realized by software.

Each of the processor and the electronic circuit is also referred to as processing circuitry. That is, in the image provision apparatus 100, the functions of the image storing unit 110 and the provision unit 120 are realized by the processing circuitry.

In the image provision apparatus 100, the "unit" of each of the image storing unit 110 and the provision unit 120, that is, the "unit" of each of the decomposition unit 111, the storing unit 112, the acquisition unit 121, and the generation unit 122 may be interpreted as a "step". The "process" of each of the decomposition process, the storing process, the acquisition process, and the generation process may be interpreted as a "program", a "program product", or a "computer readable storage medium recording a program".

Description of Effects of this Embodiment

As described above, the image provision apparatus 100 according to this embodiment can manage image data by further decomposing a raster line. Therefore, according to the image provision apparatus 100 of this embodiment, the amount of data read in image processing can be reduced, and the time required for the image processing can be shortened.

Second Embodiment

In this embodiment, differences from the first embodiment will be described.

The configuration of the image provision apparatus 100 according to this embodiment is substantially the same as the configuration of the image provision apparatus 100 of the first embodiment described with reference to FIG. 1. In this embodiment, the components that are substantially the same as those of the first embodiment are denoted by the same reference sings, and description thereof will be omitted.

If an image that is cut out from the original image is still large, the image needs to be reduced in size in order to be displayed on a screen. However, if a user of the image provision apparatus acquires a large image from the image provision apparatus and reduces it, a large amount of data needs to be transferred, resulting in increased overhead. In this embodiment, therefore, the image provision apparatus is adapted to further perform a reduction process.

In this embodiment, the acquisition unit 121 accepts the provision request 52 including reduction information to request the reduction of the partial image 63.

The generation unit 122 generates the partial image 63 of a reduced size as a reduced image, based on the unit image data set 711 and the reduction information.

First, an outline of the reduction process will be described.

The reduction of an image is done by creating the image of a size of one-Nth (N is a natural number), such as one-half or one-third. The provision request includes information such as "to be reduced to one-Nth", as the reduction information to request the reduction of the image. It is assumed here that one-half means that the image size is reduced to one-half in each of the X and Y directions. That is, the area is reduced to one-fourth.

A simple method for creating such a reduced image is to extract pixels of the original image by skipping some pixels and combine the extracted pixels. However, such a simple method may cause an unnatural pattern to appear in the image. To prevent such a pattern, blur processing is used.

Although blur processing can be performed by various techniques, it is desirable to use a linear filter such as a Gaussian filter because the amount of processing can be reduced. More specifically, the values of pixels of the reduced image to be newly created are created by multiplying a weighting value called an operator and each of the values of the pixels of the original image and calculating the sum of the obtained values. The reduced image is thus created by creating the pixels necessary for the reduced image and combining the pixels.

Figure 7:
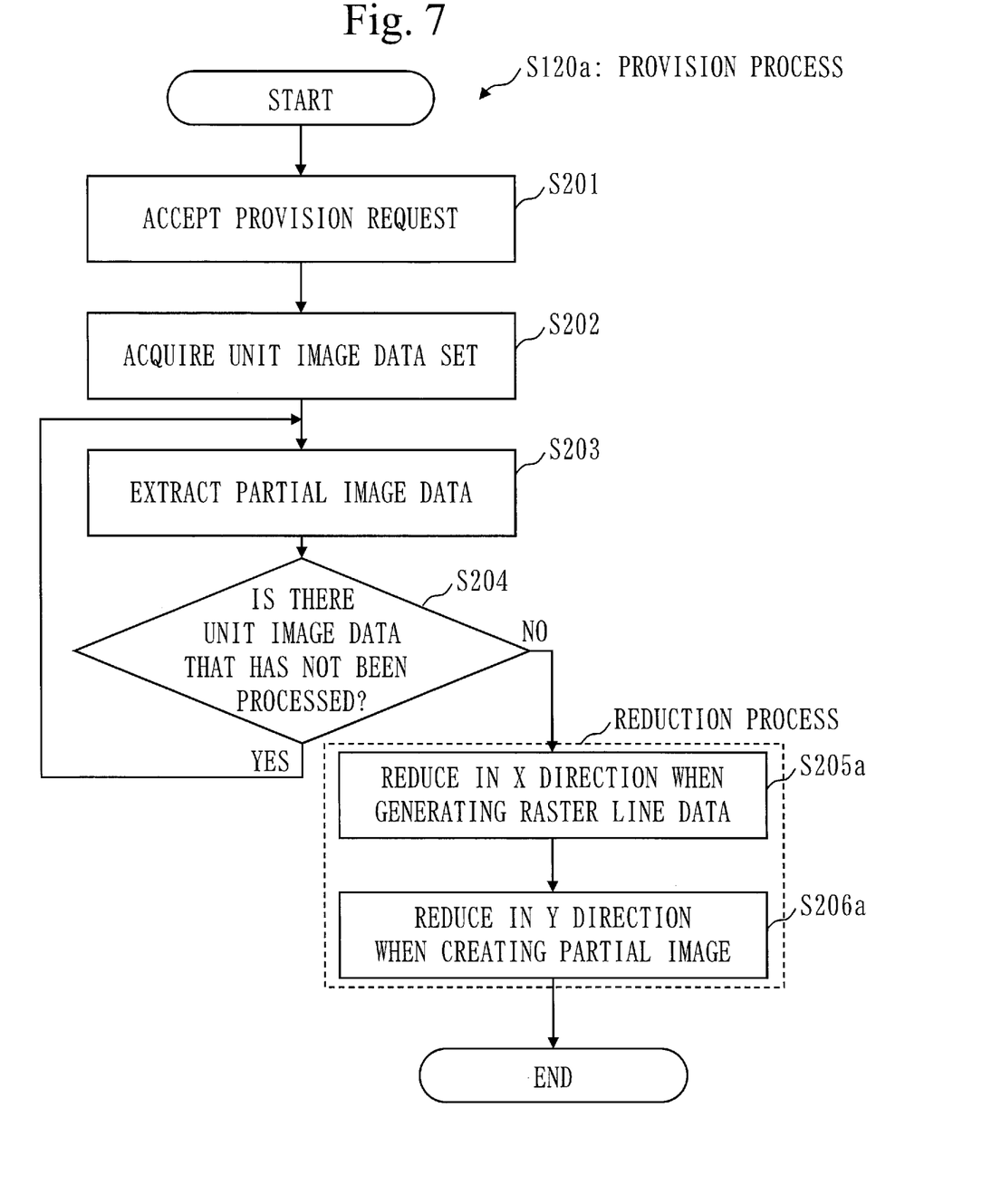
FIG. 7 is a flowchart of a provision process S120a according to a second embodiment.
Figure 8:
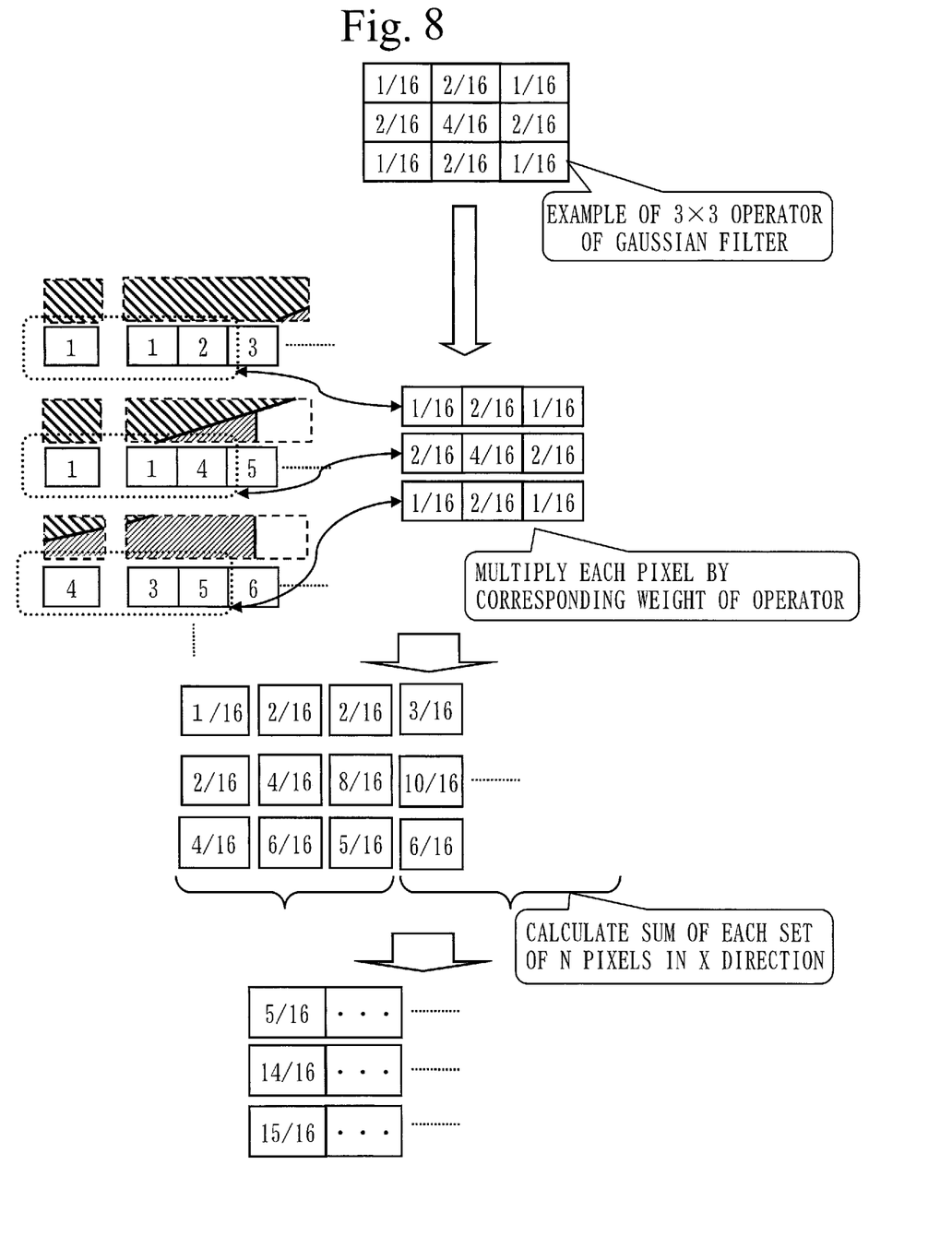
FIG. 8 is a diagram illustrating details of a reduction process according to the second embodiment.

Next, the reduction process of the image provision apparatus 100 according to this embodiment will be described with reference to FIGS. 7 to 9. FIG. 7 is a diagram corresponding to FIG. 4 of the first embodiment, and differences from FIG. 4 are steps S205a and S206a.

The reduction process is realized by the raster combining unit 201 and the image combining unit 202.

Regardless of the presence or absence of the reduction process, the process up to the extraction of the partial image data set 731 by the extraction unit 221 is substantially the same as steps S201 to S204 of FIG. 4.

In step S205a, the raster combining unit 201 performs the reduction process in the X direction when combining the partial image data set 731 in the X direction to create pieces of raster line data. Specifically, as illustrated in FIG. 8, when the image of a size of one-Nth is to be created, an operator whose size is N×N is prepared. Then, as the operator is shifted successively by N pixels in both the X and Y directions, the value of each pixel of every N×N pixels of the partial image data set 731 is multiplied by a corresponding value in the operator. If the size of the image extracted by the extraction unit 221 is not a multiple of N, pixels at the edge are left over as the remainder. This edge is truncated. Then, the sum of the obtained values of each set of N pixels in the X direction is calculated to create a raster line reduced to one-Nth in the X direction.

Figure 9:
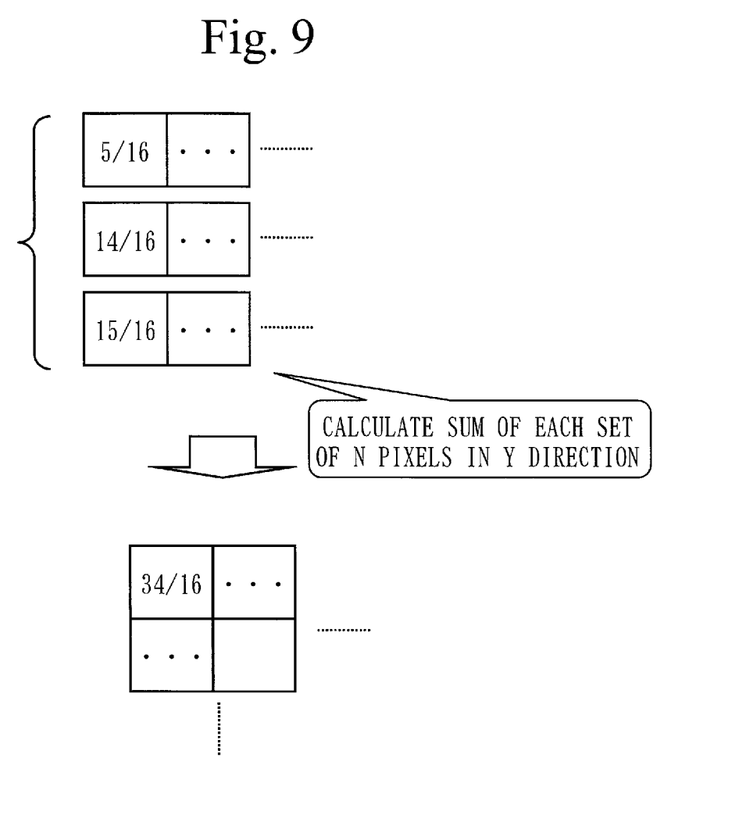
FIG. 9 is a diagram illustrating details of the reduction process according to the second embodiment.

Further, in step S206a, the image combining unit 202 calculates the sum of each set of N pixels in the Y direction when combining the obtained raster lines, as illustrated in FIG. 9, so as to create the image of a size of one-Nth.

Note that a method of simply thinning out the pixels of the original image may be used as the reduction process. The use of the simple thinning method may cause an unnatural pattern to appear in the image. However, the use of the simple thinning method can simplify the reduction process. Alternatively, a method of simply averaging the pixels of the original image may be used. The use of the simple averaging method, instead of the Gaussian filter, can also simplify the reduction process.

In the image provision apparatus according to this embodiment, the image reduction function is added to the provision unit. This allows the image provision apparatus according to this embodiment not only to cut out an image, but also to provide a reduced image that has been reduced in size.

Note that in the first and second embodiments, the row direction and the column direction may be interchanged. That is, the first and second embodiments can be implemented even when the X direction (lateral direction) and the Y direction (longitudinal direction) are interchanged in the description of these embodiments.

In the first and second embodiments, each unit of the image provision apparatus is described as an independent functional block. However, the configuration of the image provision apparatus is not limited to the configurations described in the above embodiments. The functional blocks of the image provision apparatus may be arranged in any configuration, provided that the functions described in the above embodiments can be realized.

Portions of the first and second embodiments may be implemented in combination. Alternatively, one portion of these embodiments may be implemented. Alternatively, these embodiments may be implemented as a whole or partially in any combination.

Note that the embodiments described above are essentially preferred examples and are not intended to limit the scope of the present invention, the scope of applications of the present invention, and the scope of intended uses of the present invention. Various modifications may be made to the embodiments described above as necessary.

REFERENCE SIGNS LIST

51: storage request, 52: provision request, 60: image, 61: unit image, 62: decomposed image, 63: partial image, 70: image data, 71: unit image data, 72: decomposed image data, 73: partial image data, 100: image provision apparatus, 101: image decomposition unit, 102: raster decomposition unit, 110: image storing unit, 111: decomposition unit, 112: storing unit, 120: provision unit, 121: acquisition unit, 122: generation unit, 130: memory unit, 131: image management information, 221: extraction unit, 222: combining unit, 201: raster combining unit, 202: image combining unit, 310: position information, 711: unit image data set, 731: partial image data set, 909: electronic circuit, 910: processor, 921: memory, 922: auxiliary storage device, 930: input interface, 940: output interface, 950: communication device, S110: image storage process, S120: provision process.

The invention claimed is:
1. An image provision apparatus comprising:
processing circuitry to:
decompose image data representing an image into pieces of decomposed image data representing decomposed images obtained by decomposing the image into raster lines in a row direction or a column direction;
decompose each piece of the pieces of decomposed image data into pieces of unit image data representing unit images obtained by further decomposing each of the decomposed images;
store, in a memory, image management information including each piece of unit image data of the pieces of unit image data and position information representing a position of a corresponding one of the unit images in the image;
accept a provision request to request provision of a partial image, which is at least part of the image, the provision request including range information representing a range of the partial image in the image and reduction information to request reduction of the partial image, and acquire, as a unit image data set, a set of pieces of unit image data each representing a unit image including at least part of the partial image from the image management information, based on the range information and the position information;
extract partial image data representing at least part of the partial image from each piece of the pieces of unit image data included in the acquired unit image data set, based on the range information; and
combine pieces of partial image data extracted from the pieces of unit image data included in the unit image data set, and generate the partial image as a reduced image based on the reduction information, each pixel of the reduced image being generated using only a portion of the partial image necessary for generating each pixel.

2. The image provision apparatus according to claim 1, wherein the memory is a database with a table structure, and
wherein the processing circuitry stores the image management information in the database with a table structure.

3. An image provision method comprising:
decomposing image data representing an image into pieces of decomposed image data representing decomposed images obtained by decomposing the image into raster lines in a row direction or a column direction;
decomposing each piece of the pieces of decomposed image data into pieces of unit image data representing unit images obtained by further decomposing each of the decomposed images;
storing, in a memory, image management information including each piece of unit image data of the pieces of unit image data and position information representing a position of a corresponding one of the unit images in the image;
accepting a provision request to request provision of a partial image, which is at least part of the image, the provision request including range information representing a range of the partial image in the image and reduction information to request reduction of the partial image, and acquiring, as a unit image data set, a set of pieces of unit image data each representing a unit image including at least part of the partial image from the image management information, based on the range information and the position information;

extracting partial image data representing at least part of the partial image from each piece of the pieces of unit image data included in the acquired unit image data set, based on the range information; and combining pieces of partial image data extracted from the pieces of unit image data included in the unit image data set, and generating the partial image as a reduced image based on the reduction information, each pixel of the reduced image being generated using only a portion of the partial image necessary for generating each pixel.

4. A non-transitory computer readable medium storing an image provision program for causing a computer to execute:

an image decomposition process to decompose image data representing an image into pieces of decomposed image data representing decomposed images obtained by decomposing the image into raster lines in a row direction or a column direction;

a raster decomposition process to decompose each piece of the pieces of decomposed image data into pieces of unit image data representing unit images obtained by further decomposing each of the decomposed images;

a storing process to store, in a memory, image management information including each piece of unit image data of the pieces of unit image data and position information representing a position of a corresponding one of the unit images in the image;

an acquisition process to accept a provision request to request provision of a partial image, which is at least part of the image, the provision request including range information representing a range of the partial image in the image and reduction information to request reduction of the partial image, and acquire, as a unit image data set, a set of pieces of unit image data each representing a unit image including at least part of the partial image from the image management information, based on the range information and the position information;

an extraction process to extract partial image data representing at least part of the partial image from each piece of the pieces of unit image data included in the unit image data set acquired by the acquisition process, based on the range information; and a combining process to combine pieces of partial image data extracted from the pieces of unit image data included in the unit image data set, and generate the partial image as a reduced image based on the reduction information, each pixel of the reduced image being generated using only a portion of the partial image necessary for generating each pixel.

\* \* \* \* \*